P. KEIL & E. A. STEPHENS.
SCALE PAN SUPPORT.
APPLICATION FILED OCT. 12, 1910.
1,072,956.
Patented Sept. 9, 1913.
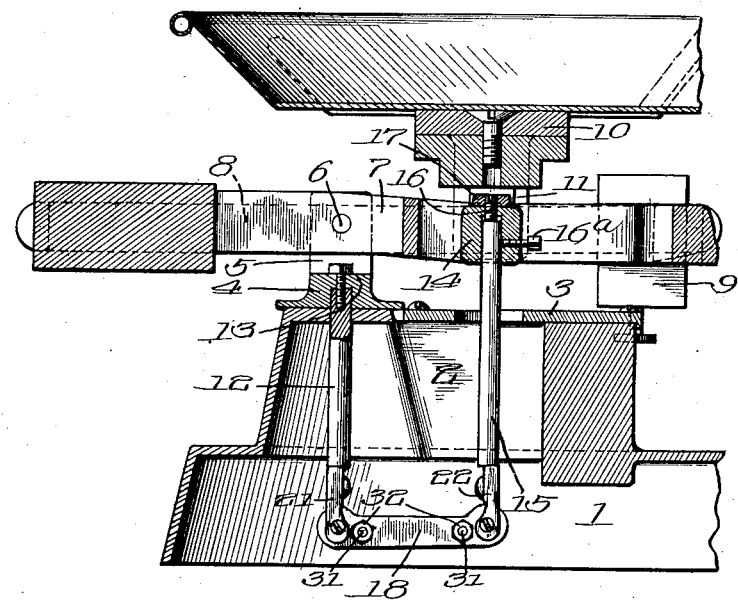
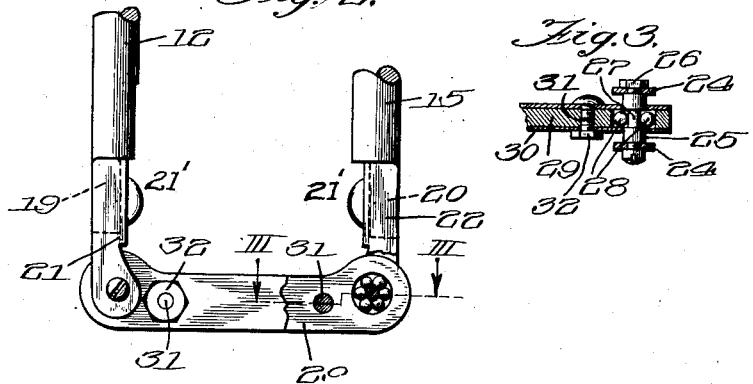
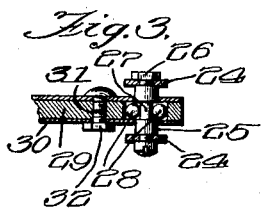
Witnesses:
Inventors:
Peter Keil
Ernest A. Stephens
By Brown & Hopkins
Attys.

UNITED STATES PATENT OFFICE.

PETER KEIL AND ERNEST A. STEPHENS, OF ELKHART, INDIANA, ASSIGNORS TO JOSEPH E. COCHRAN, OF ELKHART, INDIANA.

SCALE-PAN SUPPORT.

1,072,956.  Specification of Letters Patent.  Patented Sept. 9, 1913.

Application filed October 12, 1910. Serial No. 586,807.

*To all whom it may concern:*

Be it known that we, PETER KEIL and ERNEST A. STEPHENS, both citizens of the United States, residing at Elkhart, in the county of Elkhart and State of Indiana, have invented certain new and useful Improvements in Scale-Pan Supports, of which the following is a specification.

This invention relates to scale pan supports and has for its primary object to provide a new construction, combination and arrangement of parts in a device of this nature.

One of the objects of this invention is to provide improved means for maintaining the scale pan in an upright position.

Another object is to provide an improved combination and arrangement of parts in the supporting and guiding links whereby the scale pan is supported in upright position on a pivotally mounted scale beam.

Another object is to provide an improved connection between the guide links and the scale pan support.

Another object is to provide improved means for mounting the guide links upon the base of the scale.

Other and further objects will appear in the specification and be specifically pointed out in the appended claims, reference being had to the accompanying drawings exemplifying the invention, and in which—

Figure 1 is a longitudinal section of a portion of a scale provided with our improvements, parts being shown in elevation. Fig. 2 is a detail elevation of portions of some of the links, parts being broken away to show the interior construction of one of the links. Fig. 3 is a section on the line III—III, Fig. 2.

Referring more specifically to the exemplification of the invention shown in the drawings, a base member 1 provided with a vertically projecting pedestal or stand 2 is provided with a top plate 3. Rigidly supported on the top plate 3 in any suitable manner is a supporting bracket 4 provided with bracket arms 5 upon which is pivotally mounted at 6 a scale beam 7, said scale beam being provided in the usual manner with a poise scale bar 8 indicated in dotted lines in Fig. 1 upon which slides a poise weight 9. Swingingly mounted upon the scale beam 7 in any usual or well known manner, is a scale pan support comprising a cross bar 10 with depending arms 11 which are usually mounted on knife edges carried by the scale beam 7 by means of agate bearings. Projecting through the cover plate 3 and seated in a socket in the base of the supporting bracket 4, is a post 12 which is held in position by means of a stud screw 13 which passes through a perforation in the bracket support 4 and threads into a threaded hole within the upper end of the post 12. Adjustably connected with the scale pan support 10 preferably by being slidably mounted in a circular hole formed in the depending portion 14 of the scale pan support, is a rod or member 15 which is held in its adjusted position by means of a set screw 16 threaded within the part 14 and engaging the upper end of the rod 15. In order to provide an adjustable abutment for the rod 15, a grub screw 16 is threaded in the part 14 and projects through from the upper face of said part 14 into the socket for the rod 15. Said grub screw or abutment 16 may therefore be moved backwardly and forwardly to limit the upward movement of the rod 15. A lock nut 17 serves to lock the grub screw 16 in any desired position. Connecting the lower ends of the depending post 12 and the rod 15 in such a manner as to maintain the rod 15 in an upright position for any position to which the scale beam may be swung, is a connecting link 18 which is pivotally connected at its ends with the post 12 and rod 15 respectively in the manner now to be pointed out. Referring now to Figs. 2 and 3, the lower ends of said post 12 and rod 15 are reduced in size at 19 and 20 respectively for the reception of bearing brackets 21, 22, said bearing brackets being provided with flanges projecting on opposite sides of the reduced portions 19 and 20 and secured thereto by means of bolts or rivets 21'. As shown in Fig. 3, each of the bearing brackets is provided with a pair of depending arms 24 within which a bearing pin 25 is rigidly secured by a nut 26. Said bearing pin is provided adjacent its center with a reduced neck portion 27 which provides a race for a plurality of ball bearings 28 which are mounted between said reduced neck 27 and the cylindrical wall of a hole provided in a link 29. On opposite sides of the links 29 are a pair of link bands 30 which are rigidly locked to the link 29 by means of suitable fastenings such as screws 31 held in position by nuts 32. The bands or straps 30 are provided with perforations fitting the larger portions of the bearing pin 25 about which they fit snugly to inclose the balls 28.

What we claim is—

1. In a scale, the combination with a pivotally mounted scale beam, of a scale pan support swingingly mounted on said scale beam, a rigidly mounted post, a rod depending from and adjustably connected to said scale pan support, a link pivotally connected at its ends with said post and depending rod respectively, and an adjustable abutment for said depending rod.

2. In a scale, the combination with a base member, of a post depending therefrom, a scale beam pivotally mounted on said base member, a scale pan support pivotally mounted on said scale beam, a depending rod adjustably connected to said scale pan support, means for rigidly locking said rod in any position to which it may be adjusted, an abutment for said rod, said abutment being adjustably mounted in said scale pan support, means for locking said abutment in any adjusted position, and a link pivotally connected at its ends to said depending post and rod respectively.

3. In a scale, the combination of a base member provided with a hollow upright stand, said stand being provided with a perforated cover plate, a post extending through the perforation in said cover plate and depending therefrom, a bracket support mounted on said cover plate and provided with a hole into which the end of the post projects, means projecting through said bracket support and engaging said post for maintaining it in position, a scale beam pivotally mounted on said bracket support, a scale pan support pivotally mounted on said scale beam and provided with a depending rod, and a link pivotally connected at its ends with said post and rod respectively.

4. In a scale, the combination with a base member, of a scale beam pivotally mounted thereon, a scale pan support pivotally mounted on said scale beam and provided with a depending rod, a post depending from said base member, said post and rod being provided at their lower ends with reduced portions, a bearing bracket mounted on each reduced portion, a bearing pin in each bearing bracket, said bearing pins being provided with ball bearing races formed therein, and a link provided at each end with a circular aperture whereby said link is adapted to fit over the balls around said pins.

5. In a scale, the combination with a base member, of a scale beam pivotally mounted thereon, a scale pan support pivotally mounted on said scale beam and provided with a depending rod, a post depending from said base member, said post and rod being provided at their lower ends with reduced portions, a bearing bracket mounted on each reduced portion, a bearing pin in each bearing bracket, said bearing pins being provided with ball bearing races formed therein, bearing balls, a link provided at each end with a circular aperture whereby said link is adapted to fit over the balls around said pins, and a pair of straps on opposite sides of said link, said straps being rigidly secured to said link.

In testimony whereof we have signed our names to this specification, in the presence of two subscribing witnesses, on this 24th day of September, A. D. 1910.

PETER KEIL.
ERNEST A. STEPHENS.

Witnesses:
J. H. JOCHUM, Jr.,
A. O. KNIGHT.

---

Copies of this patent may be obtained for five cents each, by addressing the "Commissioner of Patents, Washington, D. C."